E. MORRIS.
LUMBER GUIDE.
APPLICATION FILED OCT. 28, 1912.
1,104,735.
Patented July 21, 1914.
2 SHEETS—SHEET 2.
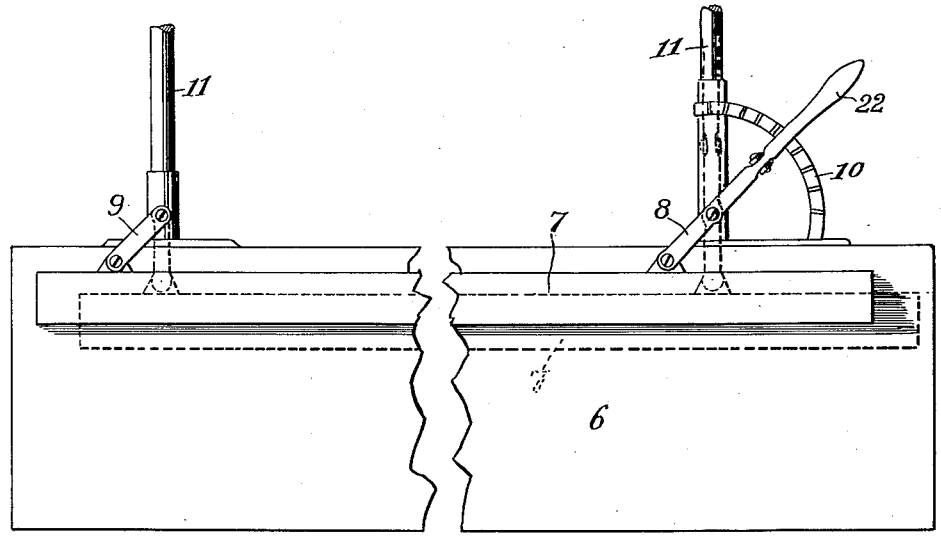
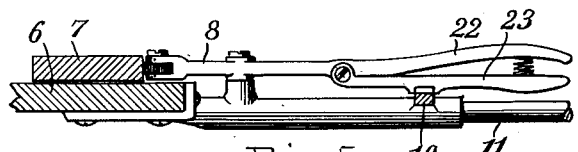
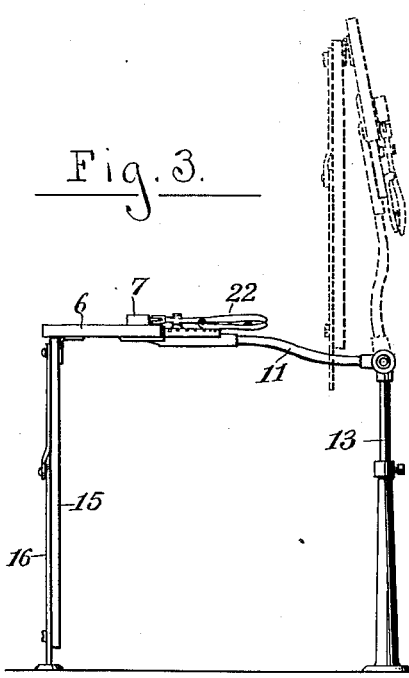
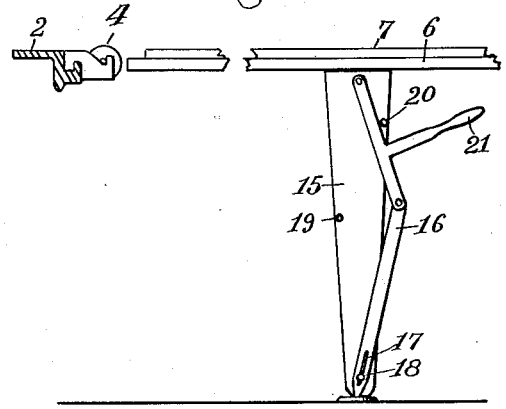
Inventor
Edmund Morris
By Luther V. Moulton
Attorney

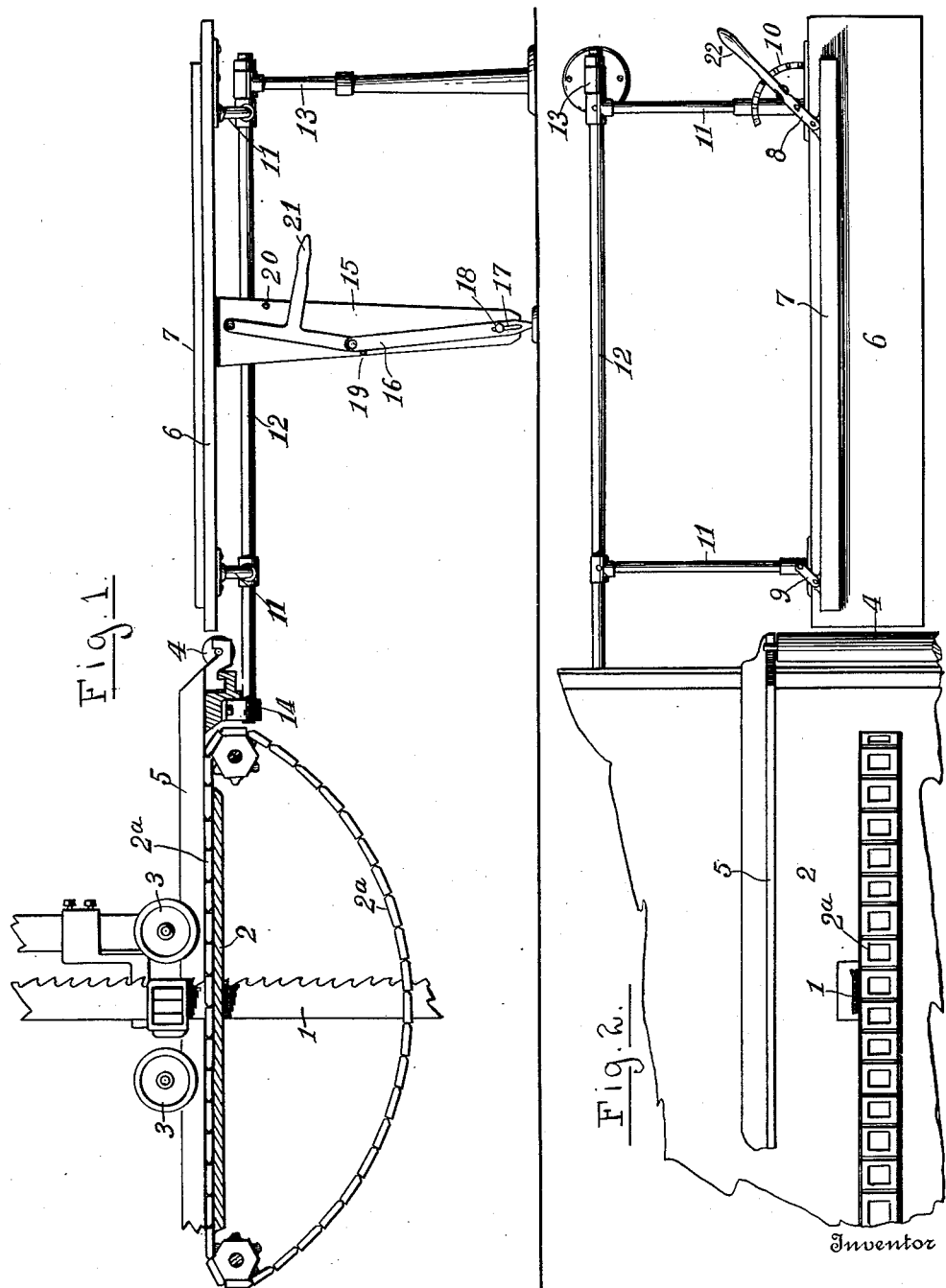

UNITED STATES PATENT OFFICE.

EDMUND MORRIS, OF GRAND RAPIDS, MICHIGAN.

LUMBER-GUIDE.

1,104,735.  Specification of Letters Patent.  Patented July 21, 1914.

Application filed October 28, 1912. Serial No. 728,152.

*To all whom it may concern:*

Be it known that I, EDMUND MORRIS, a citizen of the United States of America, residing at Grand Rapids, in the county of Kent and State of Michigan, have invented certain new and useful Improvements in Lumber-Guides; and I do hereby declare the following to be a full, clear, and exact description of the invention, such as will enable others skilled in the art to which it appertains to make and use the same.

My invention relates to improvements in lumber guides for edging lumber.

In seasoning lumber some of the boards become curved length-wise more or less, and it becomes necessary to straighten the edge of the board when rip sawing the same.

The object of my invention is to provide a suitable device to guide the lumber, to properly direct the same to the saw, and to first trim and straighten the edge of a board before ripping it up into strips.

My invention consists essentially of a vertically adjustable table carrying a horizontally adjustable guide or fence and arranged to engage the lumber before the same is fed to the saw, and to adjust the lumber in proper alinement so that it will be fed to the saw to properly trim the edge of the board, as will more fully appear by reference to the accompanying drawings in which:—

Figure 1 is a side elevation of a device embodying my invention adjusted in operative position. Fig. 2 is a plan view of the same. Fig. 3 is a front elevation, illustrating in broken lines the position of the parts when the device is turned upward and out of use. Fig. 4 is an enlarged detail in plan view illustrating the means for adjusting the guide strip 7; Fig. 5 an enlarged detail of the adjusting lever and adjacent parts; and Fig. 6 is a detail in elevation illustrating the position of the parts when the table 6 is lowered for ripping the lumber into strips.

Like numbers refer to like parts in all of the figures.

1 represents any suitable saw, 2 a saw table, $2^a$ an endless traveling bed to feed the lumber to the saw, 3 the holding down rollers, 4 the receiving roller at the front of the table and 5 a fence or guide to determine the width of the strip of lumber to be cut all being substantially as heretofore in use.

My device consists of a narrow table 6 supported with its upper surface in the plane of the upper surface of the saw table and in alinement with the bed $2^a$. On this table 6 is mounted an adjustable fence or guide 7 which is adjusted by means of pivoted arms 8, after the manner of a parallel ruler movement, toward and away from a line prolonged in the direction of the cut of the saw. The outer end of one of these arms is provided with a handle 22 to manually adjust the fence 7 and when adjusted a latch 23 engages a notched sector 10 to hold the device adjusted. The table 6 is carried on arms 11 attached to one edge thereof at one end, and to a rock shaft 12 at the other end, whereby the table may be swung upward about the axis of the rock shaft as occasion may require either entirely out of the way as shown in broken lines in Fig. 3, or downward into operative position, or below the same as occasion requires.

To support the table in operative position the rock shaft is journaled at one end in a suitable post 13, and at the other end in a bearing 14 attached to the under side of the table 2. The table 6 is also supported by a leg 15 hinged thereto near the edge opposite the arms 11 and extending downward to near the floor. To drop the table and fence below the plane of the saw table this leg at the lower end is supported at a suitable distance from the floor when in operative position, by means of a knuckle joint lever 16 which when properly adjusted for using the table 6 engages a stop pin 19 in the leg, and when the table 6 is to be lowered for the purpose of ripping the lumber the knuckle joint lever is oppositely moved against the stop pin 20 which permits the leg 15 to rest on the floor. The lower end of the lever 16 is slidably connected to the leg by means of a pin 18 in the leg traversing a slot 17 in the lever.

In operation the table 6 is adjusted with the upper surface in the plane of the surface of the saw table 2 as in Fig. 1, and the fence or guide 7 adjusted thereon so that when the edge of a board is placed against the same, the said board will be directed to the saw to trim the edge of the board to straighten the same as the board is fed to the saw by the bed 2ª. The table 6 is then dropped by shifting the lever 16 so that the fence 7 is below the plane of the saw table, the lumber can now be cut into strips in the usual way by feeding the same to the saw guided by the fence 5.

What I claim is:—

1. In combination with a rip-sawing machine having a table, a lumber guide, comprising a vertically adjustable table, an adjustable fence on the table, and means for adjusting the last named table in the plane of the saw table when in use and for swinging the same away from in front of the saw table when out of use.

2. In combination with a rip-sawing machine having a table, a lumber guide, comprising a narrow table in advance of the saw table, an adjustable fence on the narrow table, means for adjusting the narrow table in the plane of the saw table when edging lumber, and means for swinging the narrow table below the plane of the saw table and away from in front of the same when ripping lumber.

3. In combination with a rip sawing machine having a table, a second table arranged in line with the saw table, and in advance of the same, an adjustable fence on the last named table, and means for alternately adjusting the said table with its upper surface in the plane of the upper surface of the saw table and with the second table and fence below the said plane.

4. In combination with a rip-sawing machine, a lumber guide, comprising a rock shaft, arms projecting from the said shaft, a table carried by the arms, and a leg to support the table when in use, the table, arms and legs being adapted to swing upward above the rock shaft when out of use.

5. In combination with a rip sawing machine, a narrow table in advance of the machine, an adjustable fence on the table, pivoted arms attached to one edge of the table at one end, a rock-shaft supporting the arms and adapted to swing the table upward or downward out of operative position, and a leg hinged to the table adapted to support the same in operative position, and to fold against the under side of the same when the table is swung upward or downward.

6. In combination with a rip sawing machine having a saw table, a second table in advance of said machine, pivoted arms mounted on a rock-shaft at one end and attached to the second table at the other end to support the same, a leg attached to the second table to support the same below the plane of the upper surface of the saw table and adjusting means adapted to raise the second table and support the same with its upper surface in the plane of the upper surface of the saw table.

7. In combination with a rip-sawing machine having a table, a second table in advance of the saw table, an adjustable fence on the said second table, pivoted arms attached to one side of the second table at one end and to a rock-shaft at the other end, a leg pivoted to the other side of said second table, adjusting means on said leg to vertically adjust the same, and stops on the leg to control the movement of said means.

8. In combination with a rip-sawing machine having a table, a second table in advance of said saw table, an adjustable fence on the second table, a rock shaft parallel with said table, arms on said shaft and attached to one side of the second table, a leg hinged to said second table to support the same, means mounted on said leg to vertically adjust the same, and stops to limit the movement of the said means.

9. In combination with a rip-sawing machine, a rock shaft, arms on the said shaft, a narrow table carried by the arms, an adjustable fence on the table, a leg pivoted to the table, means mounted on the leg to support and adjust the same, and stops on the leg to control the movement of the said means.

In testimony whereof I affix my signature in presence of two witnesses.

EDMUND MORRIS.

Witnesses:
PALMER A. JONES,
LUTHER V. MOULTON.